United States Patent
Uchino (10) Patent No.: US 9,970,579 B2
(45) Date of Patent: May 15, 2018

(54) PIPE JOINT

(71) Applicant: SMC CORPORATION, Chiyoda-ku (JP)

(72) Inventor: Tadashi Uchino, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days. days.

(21) Appl. No.: 15/053,416

(22) Filed: Feb. 25, 2016

(65) Prior Publication Data

US 2016/0265696 A1    Sep. 15, 2016

(30) Foreign Application Priority Data

Mar. 13, 2015  (JP) .................................. 2015-050725

(51) Int. Cl.
*F16L 35/00* (2006.01)
*F16L 33/22* (2006.01)
*F16L 19/028* (2006.01)

(52) U.S. Cl.
CPC ......... *F16L 33/226* (2013.01); *F16L 19/0283* (2013.01); *F16L 2201/10* (2013.01)

(58) Field of Classification Search
CPC .... F16L 2201/06; F16L 19/005; F16L 33/226
USPC ........................................... 285/93, 92, 257
See application file for complete search history.

(56) References Cited

U.S. PATENT DOCUMENTS

| | | | | |
|---|---|---|---|---|
| 3,030,130 A | * | 4/1962 | Appleton | F16L 33/224 285/248 |
| 4,030,975 A | * | 6/1977 | Anthony | F16B 39/02 285/92 |
| 4,286,807 A | * | 9/1981 | Bachli | F16L 19/005 285/382.7 |
| 5,009,454 A | * | 4/1991 | Bartholomew | F16L 37/0987 285/24 |

(Continued)

FOREIGN PATENT DOCUMENTS

| JP | 4-111985 A | 9/1992 |
|---|---|---|
| JP | 2005-188655 | 7/2005 |

(Continued)

OTHER PUBLICATIONS

Notice of Allowance dated Jun. 22, 2016 in Japanese Patent Application No. 2015-050725 (with partial English translation).

(Continued)

*Primary Examiner* — Aaron M Dunwoody
(74) *Attorney, Agent, or Firm* — Oblon, McClelland, Maier & Neustadt, L.L.P.

(57) ABSTRACT

In a joint mechanism as a pipe joint, an indicator ring is disposed between an end of a tightening cap and an outer wall portion of a body. The indicator ring is made up from a flat section that abuts against the body, an inclined section on an outer circumferential side of the flat section, and a protrusion formed on an outer edge portion of the inclined section. The protrusion is formed in parallel along an outer circumferential surface of the tightening cap. When the tube is connected, the inclined section is pressed by the end of the (Continued)

tightening cap, whereby the inclined section becomes substantially coplanar with the flat section. Concurrently, the protrusion projects toward an outer circumferential side of the inclined section.

4 Claims, 7 Drawing Sheets

(56) References Cited

U.S. PATENT DOCUMENTS

| | | | | |
|---|---|---|---|---|
| 5,280,967 | A * | 1/1994 | Varrin, Jr. | F16B 31/028 285/382.7 |
| 5,340,163 | A * | 8/1994 | Merrer | F16L 19/005 285/334.4 |
| 6,766,761 | B1 * | 7/2004 | Tamez, Jr. | A62B 3/00 116/205 |
| 7,478,986 | B2 * | 1/2009 | Bushell | F16B 35/041 411/197 |
| 2009/0120350 | A1 * | 5/2009 | Tamez, Jr. | A62B 3/00 116/205 |
| 2011/0089683 | A1 * | 4/2011 | Maunder | F16L 33/225 285/257 |
| 2013/0147183 | A1 * | 6/2013 | Fukano | F16L 19/0283 285/93 |
| 2015/0101174 | A1 * | 4/2015 | Williams | F16B 39/108 29/525.05 |

FOREIGN PATENT DOCUMENTS

| | | |
|---|---|---|
| JP | 2013-122279 A | 6/2013 |
| JP | 5360619 | 12/2013 |
| KR | 10-2005-0025236 A | 3/2005 |

OTHER PUBLICATIONS

Office Action dated Aug. 28, 2017 in Korean Patent Application No. 10-2016-0030336 (with English language translation by the Global Dossier System).

* cited by examiner

PIPE JOINT

CROSS-REFERENCE TO RELATED APPLICATION

This application is based upon and claims the benefit of priority from Japanese Patent Application No. 2015-050725 filed on Mar. 13, 2015, the contents of which are incorporated herein by reference.

BACKGROUND OF THE INVENTION

Field of the Invention

The present invention relates to a pipe joint that connects, for example, tubes through which a fluid is introduced and discharged.

Description of the Related Art

The present applicant, as disclosed in Japanese Patent No. 5360619, has proposed a pipe joint for connecting a fluid tube to a fluid pressure device such as a cylinder or the like, and which is capable of confirming from the exterior a connected state of the fluid tube.

The pipe joint includes a body having a fluid passage in the interior thereof, a tightening cap that is screw-engaged and connects a tube to the body, and an indicator ring that is disposed between a stopper member of the body and an end of the tightening cap. The indicator ring includes a flat section, and an inclined section, which is inclined with respect to the flat section, and is formed with a smaller diameter than an outer circumferential surface of the tightening cap.

In addition, when the tightening cap is screw-rotated to thereby connect the tube, as a result of the inclined section being pressed and deformed by movement of the tightening cap, the inclined section projects radially outward with respect to the outer circumferential surface of the tightening cap, whereby the tightened state can be confirmed by the outer edge of the indicator ring.

SUMMARY OF THE INVENTION

A general object of the present invention is to provide a pipe joint, which enables a connected state of a tube with respect to a body to be confirmed with greater ease and reliability.

The present invention is characterized by a pipe joint comprising a body including a flow path in the interior thereof through which a fluid flows, a tightening member that is screw-engaged and movable forward and backward on an end of the body and serves to connect a tube through which the fluid flows with respect to the end, and a confirmation ring, which is disposed between the body and an end of the tightening member, and is exposed to exterior with respect to the tightening member when the tube is tightened by the tightening member. Further, at least one or more protrusions are included on an outer edge portion of the confirmation ring, and project diametrally outward with respect to the outer edge portion upon becoming deformed by being gripped between the tightening member and the body due to a tightening action of the tightening member.

According to the present invention, the confirmation ring is disposed between the body, in which the flow path is included in the interior thereof, and the tightening member, which is capable of advancing and retracting on the end of the body and serves to connect the tube, and is exposed to the exterior with respect to the tightening member when the tube is tightened by the tightening member. In addition, when the tube is connected to the body, the tightening member, which is capable of advancing and retracting on the end of the body, moves toward the side of the confirmation ring and presses the confirmation ring, whereby the confirmation ring becomes deformed, such that the outer edge portion of the confirmation ring becomes exposed to the exterior with respect to the tightening member, and furthermore, the protrusion projects toward the outer side of the edge portion.

Accordingly, by confirming with the protrusion, which is made to project further toward the outside from the outer edge portion of the confirmation ring, the tightened state of the tightening member with respect to the body can be visually confirmed with greater ease and reliability. Therefore, it is possible to confirm easily and reliably whether or not a secure connected state of the tube has been realized by the tightening member, and together therewith, leakage of fluid from between the tube and the body can be prevented more reliably.

The above and other objects, features and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Figure 1:
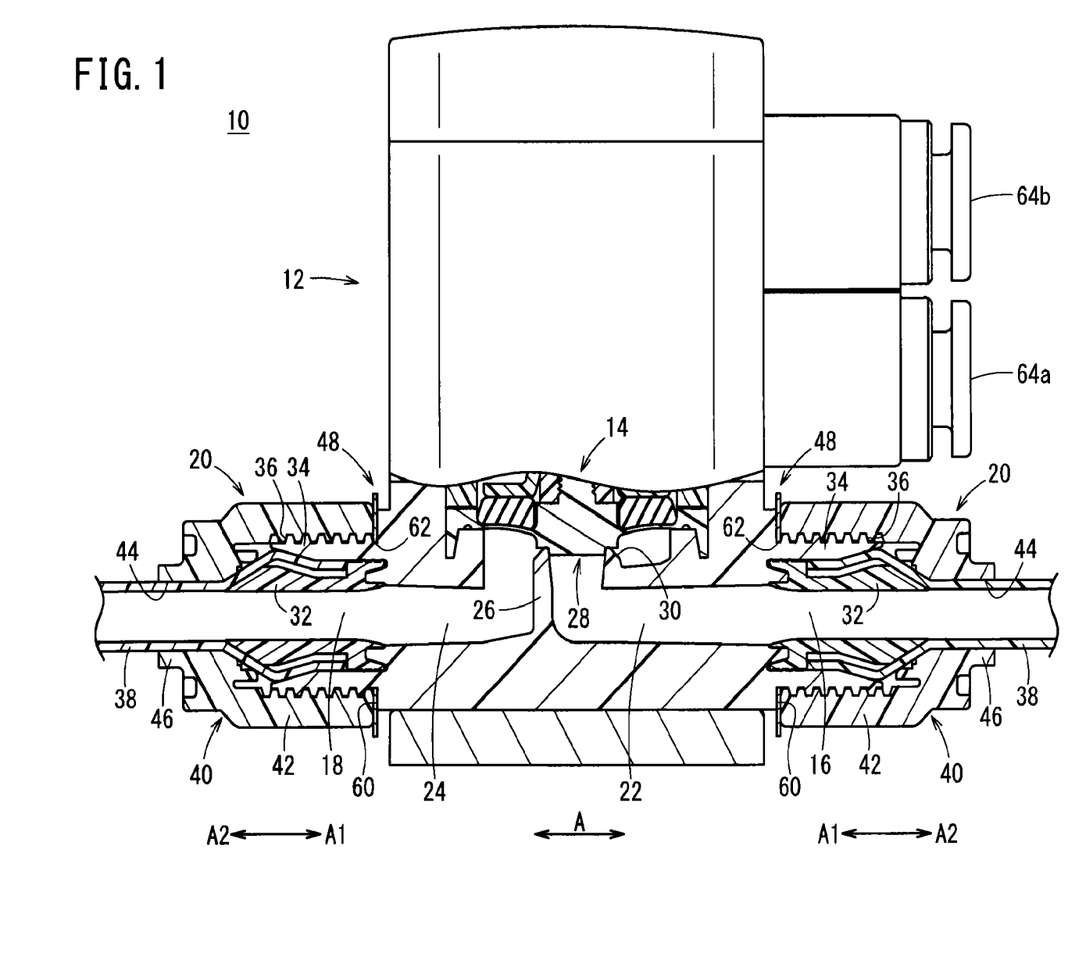
FIG. 1 is a cross sectional view with partial omission showing an on/off valve in which pipe joints according to a first embodiment of the present invention are used.
Figure 2:
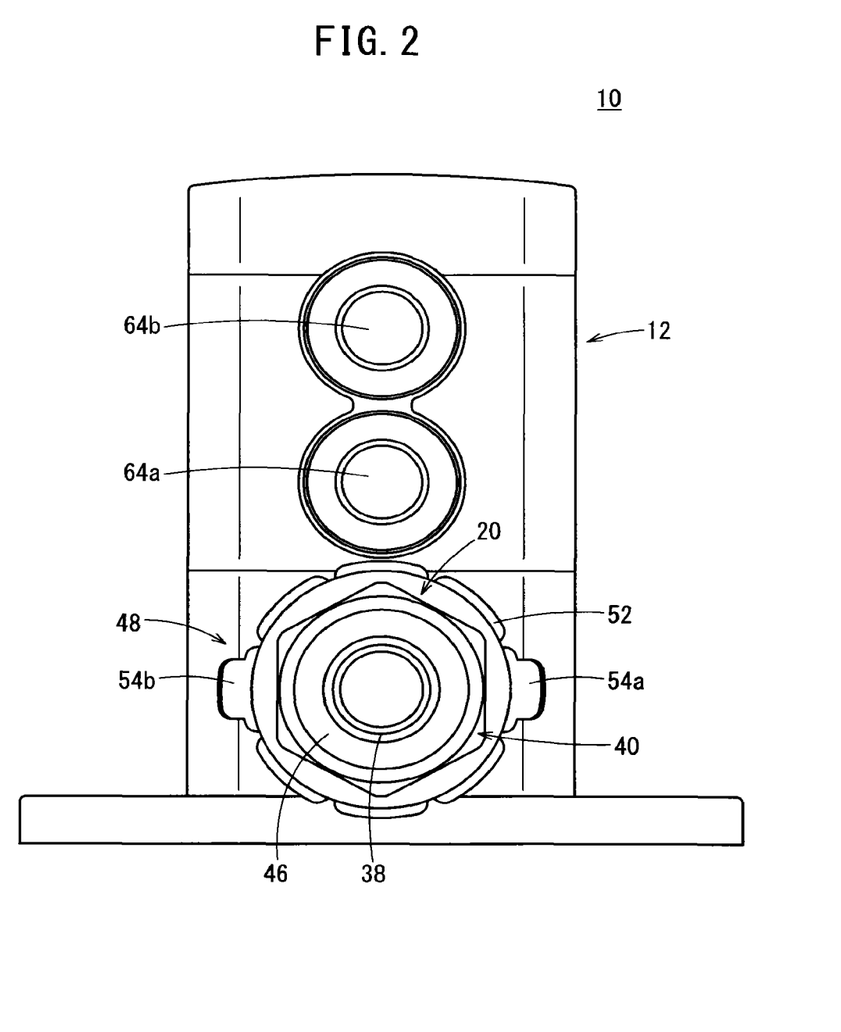
FIG. 2 is a front view of the on/off valve shown in FIG. 1.
Figure 3:
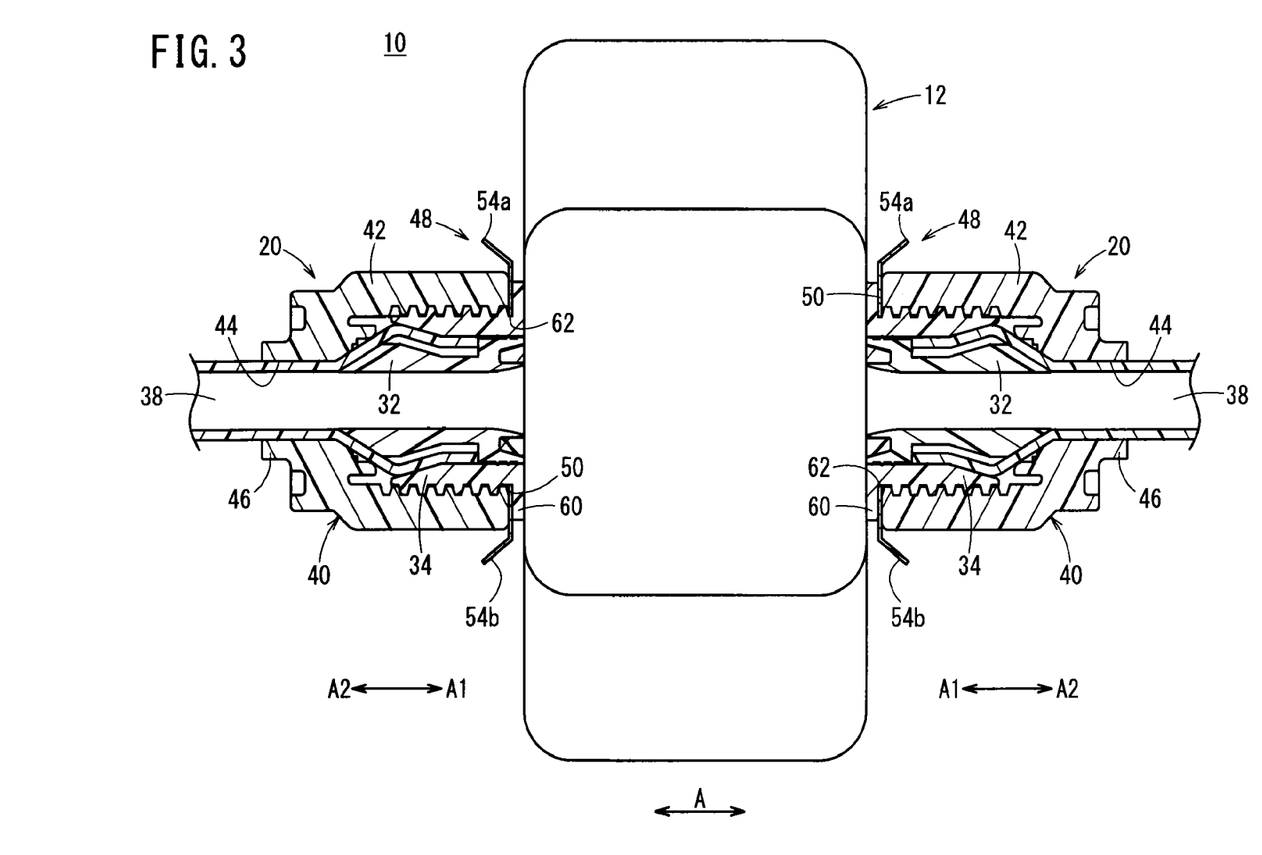
FIG. 3 is a plan view shown partially in cross section of the on/off valve shown in FIG. 1.

Below, an on/off valve, which is used in a pipe joint according to a first embodiment of the present invention, will be described as an example. As shown in FIGS. 1 through 3, an on/off valve 10 includes a body 12 having a flow path through which a pressure fluid flows, and a valve mechanism 14 disposed in the interior of the body 12. Further, joint mechanisms 20 that function as pipe joints are disposed respectively on a first port 16 and a second port 18, which are formed on one end and another end of the body 12.

In addition, in the interior of the body 12, the first port 16 is connected with a first flow path 22, and the second port 18 is connected with a second flow path 24. In addition, a partition wall 26 is formed at a border region between the first flow path 22 and the second flow path 24, and on an end thereof, a valve seat 30 is provided on which a valve body 28 of the valve mechanism 14 is capable of being seated.

Further, cylindrical guide members 32 are formed on outer circumferential sides of the first port 16 and the second port 18, together with connecting members 34 further being formed on outer circumferential sides of the guide members 32. The connecting members 34 are formed in cylindrical shapes with screw threads 36 engraved on outer circumferential surfaces thereof. Tubes 38 are inserted between the guide members 32 and the connecting members 34, together with tightening caps 40, which make up the joint mechanisms 20, being screw-engaged on outer circumferential sides of the connecting members 34.

The tightening cap 40 is formed in a cylindrical shape and constituted from a large diameter portion 42 that is screw-engaged with the connecting member 34, and a small diameter portion 46 having a tube opening 44 therein through which the tube 38 is inserted. A female screw thread portion is formed on an inner circumferential surface of the large diameter portion 42.

In addition, by screw-engagement of the tightening caps 40 onto the connecting members 34 of the body 12 in a state with the tubes 38 inserted through the interiors thereof, and by being moved toward the side of the body 12 (in the directions of the arrows A1), ends of the tubes 38 are gripped and retained between the small diameter portions 46 of the tightening caps 40, the guide members 32, and the connecting members 34.

Further, indicator rings (confirmation rings) 48 are disposed between the body 12 and the ends of the tightening caps 40.

Figure 4:
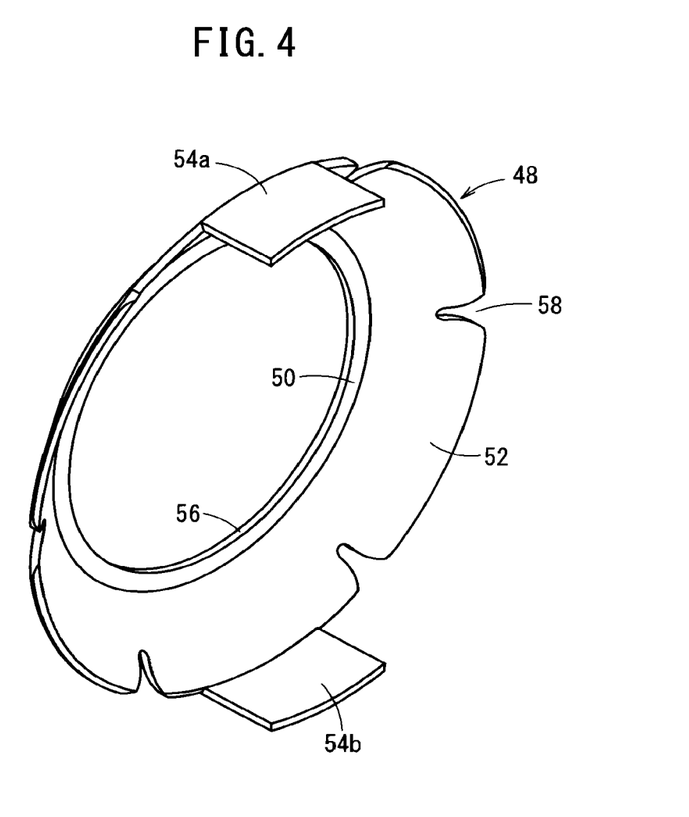
FIG. 4 is an exterior perspective view of an indicator ring that constitutes part of the on/off valve of FIG. 1.

The indicator rings 48, as shown in FIGS. 1 through 4, for example are formed from an elastically deformable resin material, and are formed with a predetermined width in the radial direction and annular shapes having a substantially constant thickness. Further, as shown in FIG. 4, each of the indicator rings 48 is equipped with an annular shaped flat section 50 in a substantial central portion, an inclined section 52, which is inclined and extends at a predetermined angle with respect to the flat section 50 from an outer edge portion of the flat section 50, and a pair of protrusions 54a, 54b, which project outwardly further from the outer edge portion of the inclined section 52.

The flat sections 50 are substantially planar in shape, and the flat sections 50 are inserted over and retained on the outer circumferential sides of the connecting members 34 of the body 12 through openings 56, which are formed in the centers of the flat sections 50.

In the inclined sections 52, plural slits 58 are provided, which are inclined at roughly 120° with respect to the flat sections 50, extend radially inward from the outer edge portion of the inclined sections 52, and are separated mutually at substantially equal intervals along the circumferential direction.

The protrusions 54a, 54b are formed to project at predetermined lengths along axial directions (the directions of the arrow A) of the indicator rings 48 with respect to the outer edge portions of the inclined sections 52, and for example, are formed with rectangular shapes in cross section, and are disposed at symmetrical positions with respect to the centers of the indicator rings 48. Moreover, the protrusions 54a, 54b are not limited to being provided as a pair, and insofar as at least one or more of such protrusions are provided, the quantity thereof is not particularly limited, and may be set suitably to any quantity as may be necessary.

In addition, the indicator rings 48 are inserted through the openings 56 with respect to the connecting members 34 of the body 12, and are arranged on mounting portions 62 between the screw threads 36 and outer wall portions 60 of the body 12, whereby the flat sections 50 thereof abut against the outer wall portions 60, and the protrusions 54a, 54b are disposed in a condition of extending in directions (the directions of the arrows A2) away from the outer wall portions 60 of the body 12.

The on/off valve 10, in which the pipe joint (joint mechanism 20) according to the first embodiment of the present invention is used, is basically constructed as described above. Next, a case will be described in which the tubes 38 are connected with respect to the body 12. A preparatory condition will be described in which the tubes 38 and the tightening caps 40 are not yet mounted with respect to the first and second ports 16, 18 of the body 12.

At first, in the above-described preparatory condition, a non-illustrated operator grips the indicator rings 48, and inserts the indicator rings 48 over the connecting members 34 of the body 12 through the openings 56 thereof. At this time, the indicator rings 48 are inserted such that the flat sections 50 thereof are positioned on the sides of the outer wall portions 60 of the body 12 in the directions of the arrows A1, and the protrusions 54a, 54b are in a state of projecting in directions (the directions of the arrows A2) away from the body 12.

Figure 5:
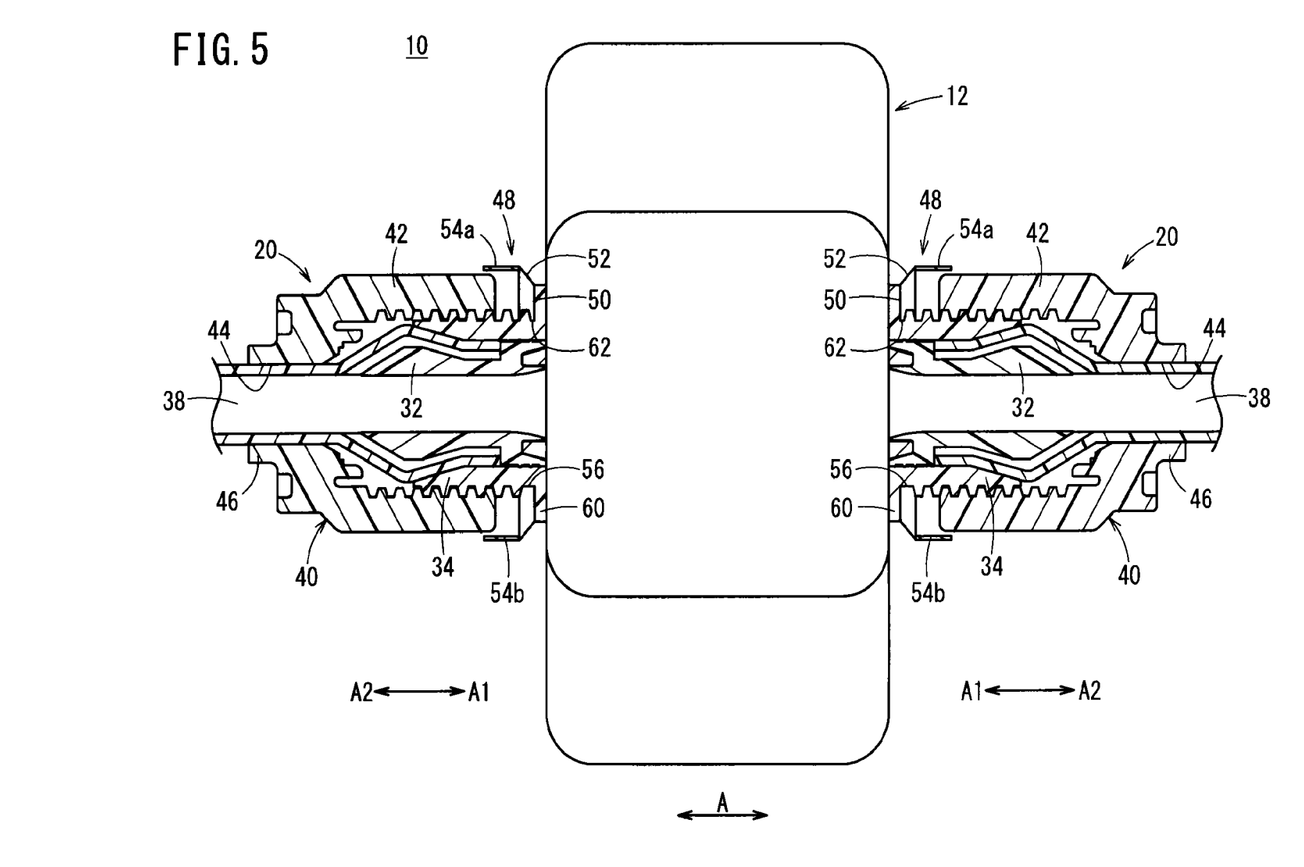
FIG. 5 is a plan view shown partially in cross section showing a condition prior to tightening of the pipe joints in the on/off valve of FIG. 4.

Additionally, as shown in FIG. 5, after the indicator rings 48 have been inserted into the mounting portions 62 between the screw threads 36 and the outer wall portions 60, the flat sections 50 are placed in abutment against the outer wall portions 60.

Next, after the ends of the tubes 38 have been inserted up to points between the guide members 32 and the connecting members 34 of the body 12, in a state in which the tubes 38 are inserted in the tube openings 44, by screw-engagement and rotation of the tightening caps 40 with respect to the connecting members 34, the tightening caps 40 are made to move (in the directions of the arrows A1) toward the sides of the body 12.

Thereafter, since the ends of the tightening caps 40 are not in abutment against the inclined sections 52 of the indicator rings 48, the inclined sections 52 remain in a state of being inclined with respect to the flat sections 50, and the protrusions 54a, 54b also are in a state of extending along the axial direction (the directions of the arrows A2). Therefore, the operator does not visually confirm the protrusions 54a, 54b of the indicator rings 48 from the sides of the body 12, and the tubes 38 are not mistakenly recognized as being in a connected state.

In addition, by screw-rotating and further moving the tightening caps 40, the ends of the tightening caps 40 abut against the inclined sections 52 of the indicator rings 48, and the inclined sections 52 are pressed gradually (in the directions of the arrows A1) toward the sides of the outer wall portions 60.

Consequently, the inclined sections 52 become deformed so that the angle of inclination thereof about the junction with the flat sections 50 become gradually larger with respect to the flat sections 50, such that the outer diameters of the indicator rings 48 become gradually enlarged. As a result, the inclined sections 52 of the indicator rings 48 are deformed so as to project gradually with respect to the outer circumferential surfaces of the tightening caps 40, together with the protrusions 54a, 54b, which are provided on the outer edge portions, becoming inclined so as to gradually rise upward.

Lastly, as shown in FIG. 3, the inclined sections 52 are deformed by the ends of the tightening caps 40 until they becomes substantially coplanar with the flat sections 50, and a condition is brought about in which the outer edges of the indicator rings 48 project beyond the outer circumferential surfaces of the tightening caps 40, while simultaneously, the protrusions 54a, 54b project diametrally outward in a state of being inclined at a predetermined angle along directions (the directions of the arrows A2) away from the body 12.

Owing thereto, as shown in FIGS. 1 through 3, the tightening caps 40 are screw-engaged completely with respect to the body 12, and by the tubes 38 being connected reliably with respect to the connecting members 34 of the body 12, a final state is achieved in which one of the tubes 38 and the first port 16 and the first flow path 22 are placed in communication, while in addition, the other of the tubes 38 and the second port 18 and the second flow path 24 are placed in communication.

More specifically, the protrusions 54a, 54b of the indicator rings 48 project further outwardly from the outer circumferential surfaces of the tightening caps 40, and project so as to be inclined in directions (the directions of the arrows A2) away from the outer wall portions 60 of the body 12. Therefore, the operator can easily confirm that the tightening cap 40 is tightened completely and that the tube 38 is reliably connected with respect to the body 12, by observing the indicator rings 48 from the sides of the body 12. Further, even if it is difficult for the protrusions 54a, 54b to be observed visually, it is possible for the operator to confirm the connected state by touching the protrusions 54a, 54b by hand.

Next, operations of the on/off valve 10, to which the tubes 38 have been connected by the joint mechanisms 20 with respect to the body 12 as described above, will briefly be described.

First, as shown in FIG. 1, by supplying a pressure fluid to one fluid supply port 64a that is provided on the body 12, a valve-open state is brought about in which the valve body 28 that makes up the valve mechanism 14 is moved in a direction to separate away from the valve seat 30, whereupon the pressure fluid from the first port 16 flows to the second port 18 through the first and second flow paths 22, 24, and the pressure fluid is supplied to another fluid pressure device through the tube 38.

On the other hand, in the case of the valve-open state, by supplying a pressure fluid to another fluid supply port 64b on the body 12 for closing the valve, a valve-closed state is brought about in which the valve body 28 of the valve mechanism 14 is moved in a direction toward the side of the valve seat 30 and is seated thereon, whereupon communication between the first port 16 and the second port 18 is blocked.

In this manner, with the first embodiment, in the on/off valve 10 in which the joint mechanism 20 is used, when the tubes 38 are connected to the connecting members 34 of the body 12, the annular indicator rings 48 are disposed on the mounting portions 62 of the body 12, and by moving the tightening caps 40, which are screw-engaged with the connecting members 34, and pressing and deforming the inclined sections 52 of the indicator rings 48 with the ends of the tightening caps 40, the pairs of protrusions 54a, 54b, which are further disposed on the outer circumferential sides of the inclined sections 52, can be made to project on the outer circumferential sides of the tightening caps 40. Further, simultaneously, the pairs of protrusions 54a, 54b can be inclined and made to project in directions (the directions of the arrows A2) away from the outer wall portions 60 of the body 12.

As a result, the tightened condition of the tightening caps 40 with respect to the body 12 can easily and reliably be confirmed visually by the protrusions 54a, 54b projecting out with respect to the tightening caps 40, while additionally, the tightened condition can also be confirmed easily and reliably by touching the protrusions 54a, 54b by hand. Therefore, in comparison with the conventional pipe joint, the connected condition of the tubes 38 by the tightening caps 40 can be confirmed more easily and reliably, and leakage of fluid from between the tubes 38 and the body 12 can more securely be prevented.

Next, a pipe joint 100 according to a second embodiment is shown in FIGS. 6A through 7B.

Figure 6A:
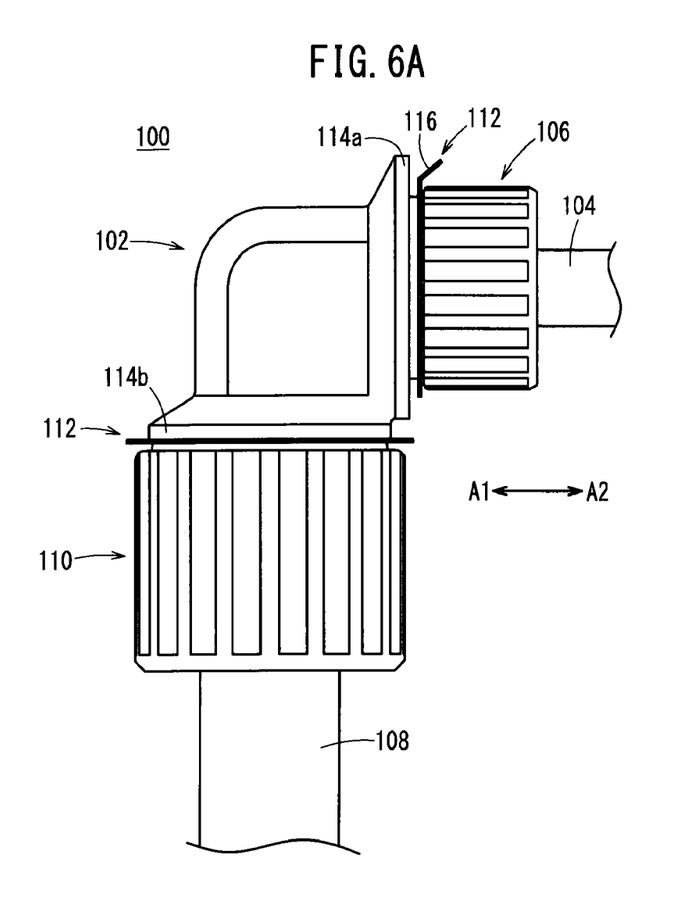
FIG. 6A is an overall front view of a pipe joint according to a second embodiment of the present invention.

As shown in FIG. 6A, the pipe joint 100 comprises a body 102 that is formed with an L-shape in cross section, a first tightening cap 106, which is screw-engaged on one end portion of the body 102 and connects a first tube 104 thereto, a second tightening cap 110, which is screw-engaged on another end portion of the body 102 and connects a second tube 108 thereto, and a pair of indicator rings (confirmation rings) 112, which are gripped respectively between the body 102 and the first and second tightening caps 106, 110.

The first tube 104 and the second tube 108 are formed with different diameters, for example, from a resin material, and the diameters of the one end portion and the other end portion of the body 102 to which the first and second tubes 104, 108 are connected also are formed differently.

The body 102 is formed such that the first tube 104 is connected by screw-engagement of the first tightening cap 106 on a connecting member (not shown) that is formed on the one end portion of the body 102, and the second tube 108 is connected by screw-engagement of the second tightening cap 110 on a connecting member that is formed on the other end portion of the body 102.

In addition, the indicator ring 112 is disposed between an end of the first tightening cap 106 and a stopper wall 114a of the body 102, and in the same manner, the indicator ring 112 is disposed between an end of the second tightening cap 110 and a stopper wall 114b of the body 102. The stopper walls 114a, 114b are formed in annular shapes and protrude at predetermined heights in diametrally outward directions.

Figure 7A:
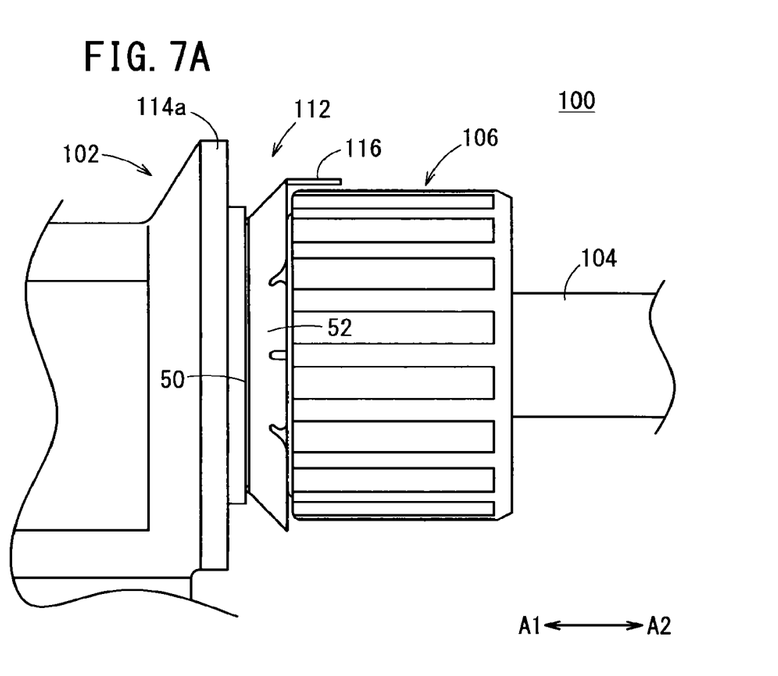
FIG. 7A is an enlarged front view showing a state prior to tightening of the tightening cap in the pipe joint of FIG. 6A.
Figure 7B:
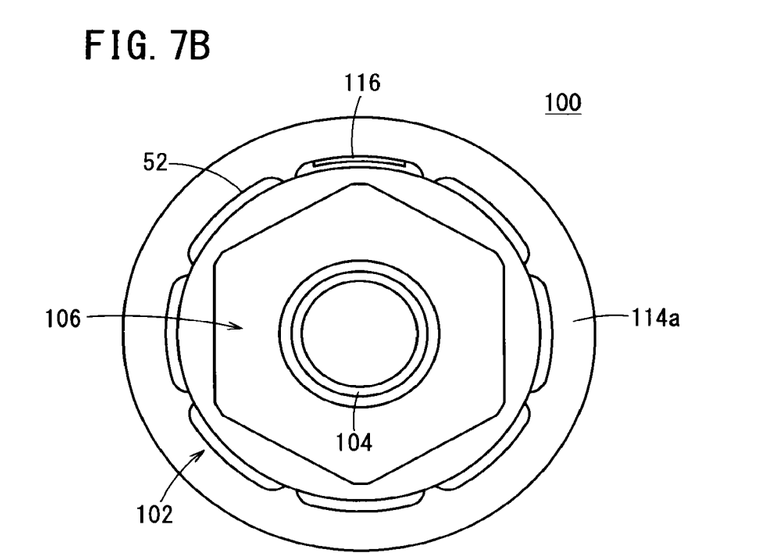
FIG. 7B is a front view in which the pipe joint of FIG. 7A is seen from one end side thereof.

The indicator ring 112 is formed with a single protrusion 116 on an outer edge portion of the inclined section 52, such that in a state prior to tightening by the first tightening cap 106, the protrusion 116 is formed so as to be substantially parallel with the axis of the first tightening cap 106 (see FIGS. 7A and 7B).

Next, a situation will be described in which the first tube 104 is connected to one end portion of the body 102 using the first tightening cap 106.

First, as shown in FIG. 7A, in a state in which the first tightening cap 106 is screw-engaged on the connecting member that is formed on the one end portion of the body 102, and the first tube 104, which has been inserted through the first tightening cap 106, is inserted into the interior of the connecting member, the protrusion 116 of the indicator ring 112 is in a substantially parallel condition with the outer circumferential surface of the first tightening cap 106, and is located more circumferentially inward than the stopper wall 114a. Therefore, as shown in FIG. 7B, the operator does not visually confirm the protrusion 116 from the side of the body 102, and the first tube 104 is not mistakenly recognized as being in a connected state.

In addition, by the operator screw-rotating and moving the first tightening cap 106 toward the side of the body 102, the inclined section 52 of the indicator ring 112 is pressed gradually (in the direction of the arrow A1) toward the side of the stopper wall 114a by the end of the first tightening cap 106. Consequently, the inclined section 52 becomes deformed so that the angle of inclination thereof about the junction with the flat section 50 gradually becomes larger with respect to the flat section 50, so that at the same time that the outer diameter of the indicator ring 112 becomes gradually enlarged, the protrusion 116 provided on the outer edge portion thereof becomes inclined so as to gradually rise upward.

Figure 6B:
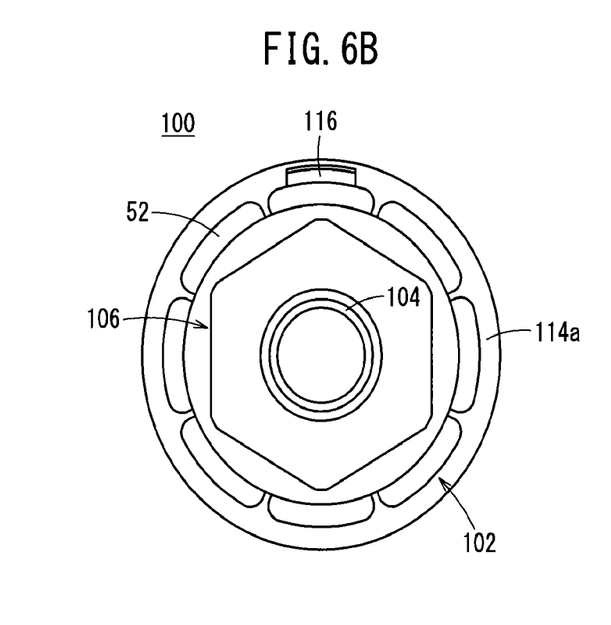
FIG. 6B is a front view in which the pipe joint of FIG. 6A is seen from one end side thereof.

Lastly, as shown in FIG. 6A, the inclined section 52 is deformed by the end of the first tightening cap 106 until it becomes substantially coplanar with the flat section 50, and a condition is brought about in which the protrusion 116 projects diametrally outward in a state of being inclined at a predetermined angle along the direction (the direction of the arrow A2) away from the stopper wall 114a (see FIGS. 6A and 6B).

Owing thereto, the first tightening cap 106 is screw-engaged completely with respect to the body 102, the first tube 104 is reliably connected with respect to the body 102, and a state of engagement is achieved in which the first tube 104 and the fluid passage are placed in communication.

More specifically, the protrusion 116 of the indicator ring 112 projects further outwardly from the outer circumferential surface of the first tightening cap 106, and projects so as to be inclined in a direction (the direction of the arrow A2) away from the stopper wall 114a. Therefore, the operator can easily confirm that the first tightening cap 106 is tightened completely and that the first tube 104 is reliably connected with respect to the body 102, by observing the indicator ring 112 from the side of the body 102.

Further, even if it is difficult for the protrusion 116 to be observed visually, it is possible for the operator to confirm the connected state by touching with the hand the protrusion 116, which is separated from the stopper wall 114a, and further projects diametrally outward beyond the stopper wall 114a.

In the foregoing manner, in the second embodiment, with the pipe joint 100, to which the first and second tubes 104, 108 of different diameters are connected to one end side and another end side of the body 102, for example, even in the case that the outer diameters of the indicator rings 112 are smaller than the stopper walls 114a, 114b of the body 102, against which the ends of the first and second tightening caps 106, 110 abut, by using the indicator ring 112 on which the protrusion 116 is included on the outer edge portion thereof, when the first tube 104 is connected, the protrusion 116 can be made to project more outwardly than the stopper wall 114a. Therefore, the connected condition of the first tube 104 can be confirmed easily and reliably.

The pipe joint according to the present invention is not limited to the aforementioned embodiments, and it is a matter of course that various configurations could be adopted without deviating from the essential gist of the present invention.

What is claimed is:

1. A pipe joint comprising:
   a body including a flow path in an interior thereof through which a fluid flows;
   a tightening member that is screw-engaged and movable forward and backward on an end of the body and serves to connect a tube through which the fluid flows with respect to the end; and
   a confirmation ring, which is disposed between the body and an end of the tightening member, the confirmation ring includes an outer edge portion and is exposed to an exterior with respect to the tightening member when the tube is tightened by the tightening member,
   wherein an inclined section, which is inclined with respect to a flat section that abuts against the body, is included on the outer edge portion of the confirmation ring, the inclined section becoming substantially coplanar with the flat section upon being pressed by the tightening member, and
   wherein the confirmation ring includes at least one protrusion on the outer edge portion of the confirmation ring, the at least one protrusion projects diametrically outward with respect to the outer edge portion and is inclined at an angle away from the body and out of contact with each of the body and tightening member upon the confirmation ring becoming deformed by being gripped between the tightening member and the body due to a tightening action of the tightening member.

2. The pipe joint according to claim 1, wherein the protrusion extends with respect to the outer edge portion of the confirmation ring substantially in parallel with an axis of the tightening member.

3. The pipe joint according to claim 1, wherein the inclined section is divided by a plurality of slits that are separated mutually at equal intervals along a circumferential direction of the outer edge portion.

4. The pipe joint according to claim 1, wherein the confirmation ring is formed in an annular shape from an elastically deformable material.

* * * * *